Aug. 11, 1959  F. E. ELLIS, JR  2,899,150
BOUND VORTEX SKIN
Filed Sept. 8, 1952
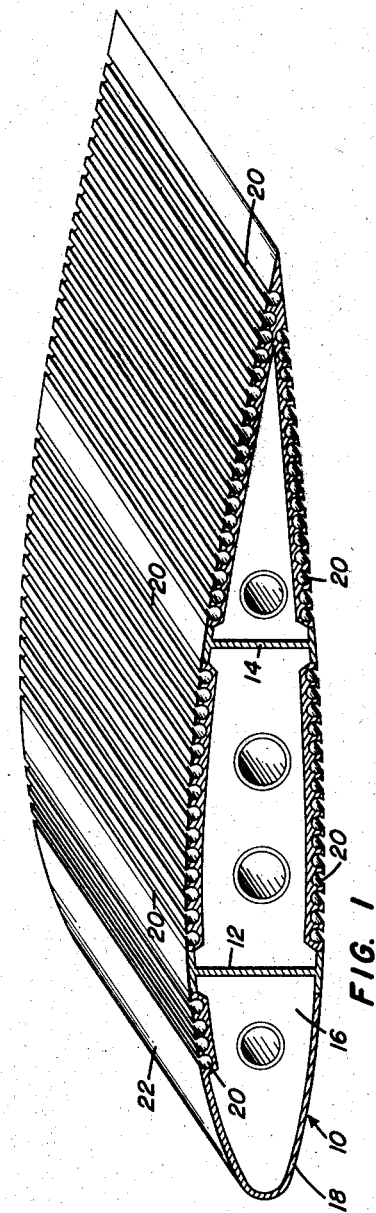
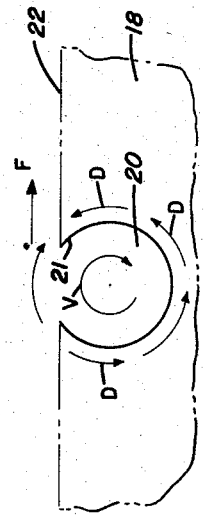
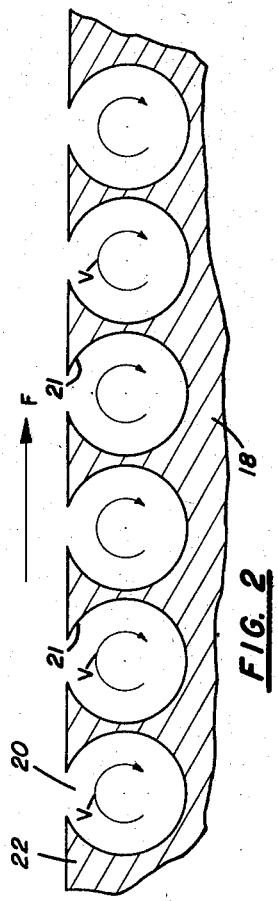
INVENTOR
FRAMPTON E. ELLIS, JR.
BY
ATTORNEYS

United States Patent Office 2,899,150
Patented Aug. 11, 1959

2,899,150

BOUND VORTEX SKIN

Frampton E. Ellis, Jr., Montgomery County, Md.

Application September 8, 1952, Serial No. 308,499

5 Claims. (Cl. 244—41)

(Granted under Title 35, U.S. Code (1952), sec. 266)

This invention relates to improvements in lift producing devices.

An object of the invention is to provide a lift producing device, such as an airfoil, propeller or any other body usually having motion with respect to a fluid medium, for example a boat hull or fuselage, with means for reducing the skin friction drag regardless of the fluid stream medium which may be either liquid or gaseous.

Another object of the invention is to provide means not only for reducing skin friction drag but also for enabling the structural skin of a vehicle, such as an aircraft or boat, to yield a very high structural strength.

A further object of the invention is to teach a method of reducing skin friction drag of a body having motion relative to a fluid stream by inducing a number of bound vortex flow patterns, each of which is located in a groove that opens through the surface of the body, accelerating the fluid in the grooves and maintaining a velocity therein less than the velocity of the fluid stream by a portion of the fluid stream in order that there be a relative motion between layers of fluid rather than between the fluid stream and the surface of the body.

Other objects and features, e.g. the attainment of greater lift from wings by delaying separation of the boundary layer, will become apparent in following the description of the invention.

In the drawing:

Fig. 1 is a fragmentary perspective view of an airfoil having the improvements provided by the invention.

Fig. 2 is a largely schematic view showing the action of the bound vortices and fluid stream thereover in any body having motion relative to a fluid, and Fig. 3 is a schematic view demonstrating the method of reducing skin friction drag of a body.

To illustrate one embodiment of the invention, a part of a wing 10 is shown, although the principles of the invention are applicable to other bodies that are adapted to have motion relative to liquid as well as air. The wing is internally constructed quite lighter than a conventional wing, including only two spars 12 and 14 and a few ribs 16. The wing skin 18 is of special construction, having a number of longitudinal grooves 20 with partially cylindrical walls 21 that open upwardly or downwardly through the outer surface of the skin material.

The principle of operation and the method of reducing skin friction when there is relative fluid-skin motion over the surfaces of the wing is discussed in connection with Figs. 2 and 3. Here it is seen that the surface 22 of skin material 18 that is exposed to fluid flow, has the concave grooves 20 in substantial parallel arrangement, although some deviation is permissible. The sides of the grooves are part of a circle in cross section and the disposition of each groove is such that it is more than half way below surface 22.

The action of the air or other fluid flowing as at F by one of the grooves 20 is to set up a vortex V or rotational flow in the groove. The force causing this rotation of fluid in the groove is due to the shearing force between the fluid flowing past the surface 22 and that contained in the groove. The fluid in the groove energized by a part of the adjacent airstream F, will thus rotate at a speed such that the differential between its peripheral velocity and the exterior stream F velocity (taking into account the boundary layer) causes a shearing force equal to the sum of the drag forces D on the rotating air due to the air's skin friction on the walls of the groove (Fig. 3).

The vortex flow V is a stable one and tends to maintain itself, and in the illustrated case it is attached to the groove and thus moves with the object through the medium whether the object is an airplane wing, fuselage, boat hull or any other. Since friction between adjacent layers of air moving at different velocities is much less than the friction of air flowing along a solid surface, it follows that the peripheral velocity of the vortex bounded by each groove will be much less than the exterior stream velocity, thereby providing an activated air cushion between the stream F and surface 22. The actual difference in velocities depends on many factors, the most important being the flow character, whether laminar or turbulent, and the Reynolds Number.

For an aircraft wing the skin material may be rolled or extruded to give the desired series of grooves. Due to the configuration of the skin material it is inherently much stronger than ordinary skin material and hence, the internal strength members of a wing may be made lighter, and many completely omitted. Therefore, any additional weight of skin material should be more than offset by weight economy within the wing.

Regarding the method, the illustrated embodiment is capable of practicing the various steps, including the establishment of a number of vortex flows and continually energizing them by a part of the airstream. However, other means such as blowing slots arranged properly may be used to carry out the method.

It is apparent that various modifications may be made that fall within the scope of the following claims without departing from the protection afforded thereby.

The invention described herein may be manufactured and used by or for the Government of the United States of America for governmental purposes without the payment of any royalties thereon or therefor.

What is claimed is:

1. A device for producing lift when there is relative motion between the device and a fluid stream, said device comprising a body having a curved upper surface forming member provided with closely spaced longitudinal grooves extending transversely to the direction of fluid flow, each groove being substantially circular in cross-section, the center of each groove lying below said surface and each groove having an open top over which the fluid is adapted to flow generating a vortex flow within the groove which flows at a velocity different from the velocity of the fluid stream whereby drag is reduced because the friction between adjacent layers of fluid moving at different velocities is less than the friction of fluid flowing along a solid surface.

2. In an airfoil, a cambered member with an outer surface, said member having means for effecting a series of bound vortex patterns across substantially the entire surface including a plurality of closely positioned spanwise grooves which are generally parallel to each other, said grooves opening upwardly through said surface and being substantially circular in cross sectional configuration, the center of each groove lying inwardly of said surface so that a part of the airstream energizes the air in said grooves to maintain the vortex flow patterns which tend to reduce skin friction and prevent separation.

3. In an airfoil including a cambered member with an outer surface exposed to fluid flow, means for generating and containing a series of bound vortex flow patterns across substantially the entire outer surface thereby reducing the skin friction of said member, said means comprising a number of grooves of substantially circular cross section opening outwardly of and through said surface and extending transversely to the direction of fluid flow, the center of each groove lying inwardly of said surface.

4. In an airfoil including a cambered member with an outer surface exposed to fluid flow, means for generating and containing a series of bound vortex flow patterns across substantially the entire outer surface thereby reducing the skin friction of said member, said means comprising a number of closely spaced, parallel grooves of substantially circular cross section opening outwardly of and through said surface, the center of each groove lying inwardly of said surface, and said grooves extending transversely to the direction of fluid flow and substantially covering the outer surface of said member.

5. An airfoil having upper and lower surfaces exposed to fluid flow, each of said surfaces being substantially covered with closely spaced, parallel grooves of substantially circular cross section opening outwardly of and through the surface, the center of each groove lying inwardly of said surfaces, and said grooves extending transversely to the direction of fluid flow for generating a series of bound vortex flow patterns thereby reducing the skin friction of the airfoil.

References Cited in the file of this patent

UNITED STATES PATENTS

| | | |
|---|---|---|
| 1,480,408 | Miller | Jan. 8, 1924 |
| 1,726,882 | Boerner | Sept. 3, 1929 |
| 1,805,722 | Ramakers et al. | May 19, 1931 |
| 1,864,803 | Clark | June 28, 1932 |
| 2,261,558 | Orloff | Nov. 4, 1941 |

FOREIGN PATENTS

| | | |
|---|---|---|
| 356,782 | Italy | Feb. 15, 1938 |
| 511,650 | Great Britain | Aug. 22, 1939 |
| 580,806 | Great Britain | Sept. 20, 1946 |
| 825,134 | France | Nov. 27, 1937 |
| 988,727 | France | May 9, 1951 |